United States Patent
Schultheis et al.

(10) Patent No.: US 9,914,541 B2
(45) Date of Patent: Mar. 13, 2018

(54) POSTURE SEAT

(71) Applicant: Zodiac Seats US LLC, Gainesville, TX (US)

(72) Inventors: Udo W. Schultheis, Wichita, SC (US); Foek (Phuc) Nguyen Tien Le, Arlington, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 104 days.

(21) Appl. No.: 15/037,380

(22) PCT Filed: Nov. 24, 2014

(86) PCT No.: PCT/US2014/067029
§ 371 (c)(1),
(2) Date: May 18, 2016

(87) PCT Pub. No.: WO2015/077680
PCT Pub. Date: May 28, 2015

(65) Prior Publication Data
US 2016/0311536 A1    Oct. 27, 2016

Related U.S. Application Data

(60) Provisional application No. 61/907,435, filed on Nov. 22, 2013.

(51) Int. Cl.
*A47C 3/00* (2006.01)
*A47C 7/02* (2006.01)
(Continued)

(52) U.S. Cl.
CPC .......... *B64D 11/0639* (2014.12); *A47C 7/022* (2013.01); *A47C 7/14* (2013.01);
(Continued)

(58) Field of Classification Search
CPC ........... A47C 7/022; A47C 7/42; A47C 9/002; A47C 3/025; A47C 7/546; A47C 3/00;
(Continued)

(56) References Cited

U.S. PATENT DOCUMENTS

| | | | | |
|---|---|---|---|---|
| 1,358,640 A | * | 11/1920 | Koyama | A47C 9/002 108/136 |
| 2,132,291 A | * | 10/1938 | Fitos | A47C 3/025 248/415 |
| 2,719,571 A | * | 10/1955 | Taylor | A47C 9/002 248/371 |
| 2,742,957 A | | 4/1956 | Young | |
| 3,181,858 A | | 5/1965 | Daniels | |
| 4,009,856 A | * | 3/1977 | Wolters | A47C 1/022 248/397 |
| 5,590,930 A | * | 1/1997 | Glockl | A47C 3/0257 297/258.1 |
| 6,487,738 B1 | * | 12/2002 | Graebe | A47C 23/043 267/82 |
| 7,044,542 B2 | * | 5/2006 | Muscat | B62J 1/007 248/219.2 |

(Continued)

FOREIGN PATENT DOCUMENTS

| | | |
|---|---|---|
| DE | 1264703 B | 3/1968 |
| WO | 200156428 A1 | 8/2001 |
| WO | 2010080025 A1 | 7/2010 |

OTHER PUBLICATIONS

International Patent Application No. PCT/US2014/067029 Search Report and Written Opinion dated Jan. 30, 2015.
(Continued)

*Primary Examiner* — Chi Q Nguyen
(74) *Attorney, Agent, or Firm* — Kilpatrick Townsend & Stockton LLP; Dean W. Russell; Tiffany L. Williams

(57) ABSTRACT

Dynamic support systems (10) include a plurality of support members (12), a base material (14), and a support layer (18). Each support member (12) has an upper support surface (20) extending from a first end of a stud (22), and a spherical member (28) extending from a second end of the stud. The base material (14) includes a plurality of receptacles (40) having a socket (42) with a recessed area (52) for positioning a spring (56). The support layer (18) also includes a plurality of apertures (64) that are positioned over the receptacles (40) and allow the studs (22) to extend there through.

20 Claims, 9 Drawing Sheets

(51) Int. Cl.
*A47C 7/14* (2006.01)
*B64D 11/06* (2006.01)
*B60N 2/28* (2006.01)
*B60N 2/70* (2006.01)
*A47C 7/40* (2006.01)
*B60N 2/02* (2006.01)

(52) U.S. Cl.
CPC .............. *A47C 7/40* (2013.01); *B60N 2/02* (2013.01); *B60N 2/2881* (2013.01); *B60N 2/7005* (2013.01); *B60N 2/7041* (2013.01); *B64D 11/0647* (2014.12); *B60N 2/70* (2013.01); *B60N 2/7047* (2013.01)

(58) Field of Classification Search
CPC .. A47C 9/00; B64D 11/0647; B64D 11/0639; B60N 2/7041; B60N 2/02; B60N 2/2881; B60N 2/7005; B60N 2/70; B60N 2/7047; B60N 2/7052; B60N 2/7094; B62J 1/007; Y10T 403/32311
USPC .......... 297/284.3, 452.42, 284.1, 452.1, 313, 297/311, 312, 215.15, 195.1, 195.11, 314; 403/90; 248/219.2, 600, 430, 288.31, 248/288.51
See application file for complete search history.

(56) References Cited

U.S. PATENT DOCUMENTS

| | | | |
|---|---|---|---|
| 7,100,983 B1* | 9/2006 | Gant | A47C 3/025 108/2 |
| 9,737,745 B2* | 8/2017 | Hugou | A63B 21/0023 |
| 2010/0066148 A1* | 3/2010 | Matthews | A01M 31/02 297/423.12 |
| 2012/0292968 A1* | 11/2012 | Lee | A47C 7/14 297/313 |
| 2013/0031712 A1* | 2/2013 | Gossett | A47C 3/34 4/496 |
| 2015/0173515 A1* | 6/2015 | Freedman | A47C 7/024 297/314 |

OTHER PUBLICATIONS

International Patent Application No. PCT/US2014/067029, International Preliminary Report on Patentability, dated Jun. 2, 2016.

* cited by examiner

POSTURE SEAT

CROSS REFERENCE TO RELATED APPLICATIONS

This application is the U.S. national phase entry of International Patent Application Serial No. PCT/US2014/1067029 ("the '029 application"), filed on Nov. 24, 2014, which application is related to and claims priority benefits from U.S. Provisional Application Ser. No. 61/907,435 ("the '435 application"), filed on Nov. 22, 2013, entitled POSTURE SEAT, the entire contents of each of the '029 and '435 applications are incorporated herein by this reference.

FIELD OF THE INVENTION

The present invention relates to an aircraft seat, which is adaptable to a range of passenger postures.

BACKGROUND

Common carriers (such as buses, trains, ships, and aircraft) often include large numbers of passenger seats that may offer limited or no recline options due to the passenger seat density. As a result, many of these seats are built in a way that allows a passenger seated therein to assume only one posture. This design is limiting, particularly for long-haul flights, where seated passengers would like to frequently change their posture to achieve more comfort.

Accordingly, it is desirable to provide a seat that will allow passengers a wider range of postures and will adapt better to human anatomy during a long-haul flight, thus increasing comfort and improving the flight experience, particularly for passengers in economy class seating, where most passengers do not convert into a sleep position.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a dynamic support system comprises a plurality of support members, each support member comprising an upper support surface extending from a first end of a stud, and a spherical member extending from a second end of the stud, a base material comprising a plurality of receptacles, each receptacle comprising a socket shaped to receive the spherical member of one of the plurality of support members, the socket comprising a recessed area, and a spring positioned within the recessed area of the socket and configured to contact a surface of the spherical member of one of the plurality of support members positioned within the socket, and a support layer positioned above the base material, wherein the support layer comprises a plurality of apertures, each aperture being shaped to allow the stud of one of the plurality of support members to extend there through.

In some embodiments, the dynamic support system further comprises a locking layer coupled to the base material, wherein the locking layer comprises a plurality of apertures, each aperture being shaped to allow the stud of one of the plurality of support members to extend there through and retain the spherical member of one of the plurality of support members within the socket.

In certain embodiments, the spring is configured to position the spherical member of one of the plurality of support members in a neutral position adjacent inner walls of one of the plurality of apertures of the locking layer. The spring may also be configured to compress within the recessed area when the support member is in a recessed position adjacent a curved bottom of the socket. A distance between the neutral position and the recessed position may be approximately 1 inch.

In some embodiments, each of the plurality of support members is configured to longitudinally translate between a neutral position and a recessed position within the socket, angularly translate in any direction between an upright position and an angled position within the surrounding aperture of the support layer, and laterally rotate within the socket.

According to some embodiments, the plurality of support members are positioned so that each upper support surface interlocks with adjacent upper support surfaces so as to form a dynamic surface with minimal gaps between the adjacent upper support surfaces. In certain embodiments, the upper support surface of the plurality of support members has a square, hexagonal, spherical, or even rectangular outer perimeter shape.

In some embodiments, at least one connection member may extend from the upper support surface to the first end of the stud. The at least one connection member may further comprise a plurality of prongs that extend from a central core, wherein the central core supports a central portion of the upper support surface, and the plurality of prongs extend to each corner or edge of the upper support surface.

In certain embodiments, the support layer comprises a grid design comprising a plurality of intersecting grid lines with the plurality of apertures positioned at intersections of at least some of the grid lines.

According to certain embodiments of the present invention, a passenger seat comprises a seat pan and a seat back, wherein at least one of the seat pan and the seat back are substantially covered by a dynamic support system comprising a plurality of support members, each support member comprising a flexible upper support surface extending from a first end of a stud, and a spherical member extending from a second end of the stud, a base material comprising a plurality of receptacles, each receptacle comprising a socket shaped to receive the spherical member, the socket comprising a recessed area, and a spring positioned within the recessed area and configured to contact a surface of the spherical member positioned within the socket, a locking layer coupled to the base material, wherein the locking layer comprises a plurality of apertures, each aperture being shaped to allow the stud of each support member to extend there through and retain the spherical member within the socket, and a support layer positioned above the locking layer, wherein the support layer comprises a plurality of apertures, each aperture being shaped to allow the stud of each support member to extend there through.

According to these embodiments, the passenger seat further comprises a first portion of the plurality of support members, wherein each of the first portion comprises flexible upper support surfaces having an outer surface with at least one of a length dimension and a width dimension less than approximately 1 inch, and a second portion of the plurality of support members, wherein each of the second portion comprises flexible upper support surfaces having an outer surface with at least one of a length dimension and a width dimension greater than approximately 2 inches.

The first portion may positioned on at least one of the seat pan and the seat back in at least one area where a portion of a passenger's body seated in the passenger seat that contacts the first portion of the plurality of support members is substantially contoured. The second portion may be positioned on at least one of the seat pan and the seat back in at least one area where a portion of a passenger's body seated in the passenger seat that contacts the first portion of the plurality of support members is not substantially contoured.

In certain embodiments, each of the plurality of support members is configured to longitudinally translate between a neutral position and a recessed position within the socket, angularly translate in any direction between an upright position and an angled position within the surrounding aperture of the support layer, and laterally rotate within the socket.

The plurality of support members may be positioned so that each upper support surface interlocks with adjacent upper support surfaces so as to form a dynamic surface with minimal gaps between the adjacent upper support surfaces.

According to certain embodiments of the present invention, a method of assembling a dynamic support system comprising a base material comprising a plurality of receptacles, each receptacle comprising a socket, a support layer comprising a plurality of apertures, and a plurality of support members, each support member comprising an upper support surface extending from a first end of a stud and a spherical member extending from a second end of the stud, comprises inserting the spherical member of each support member into the socket of one of the plurality of receptacles in the base material, and positioning the support layer over the locking layer so that the stud of each support member extends through one of the plurality of apertures of the support layer.

The method may further comprise coupling the upper support surface to the first end of each stud and/or positioning a cushion layer over the upper support surfaces of the plurality of support members.

BRIEF DESCRIPTION OF THE DRAWINGS

In the following detailed description, embodiments of the invention are described referring to the following figures.

DETAILED DESCRIPTION

Figure 1:
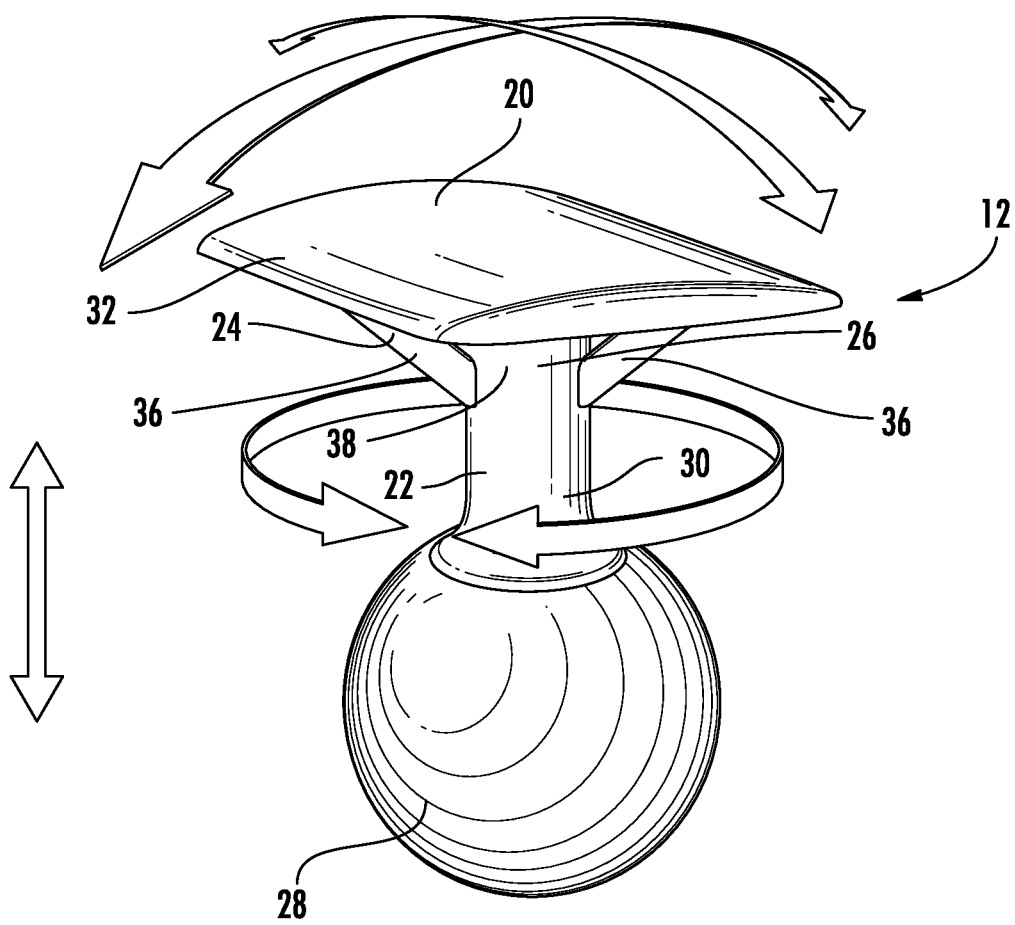
FIG. 1 is a perspective view of a support member for a dynamic support system, according to certain embodiments of the present invention.
Figure 2:
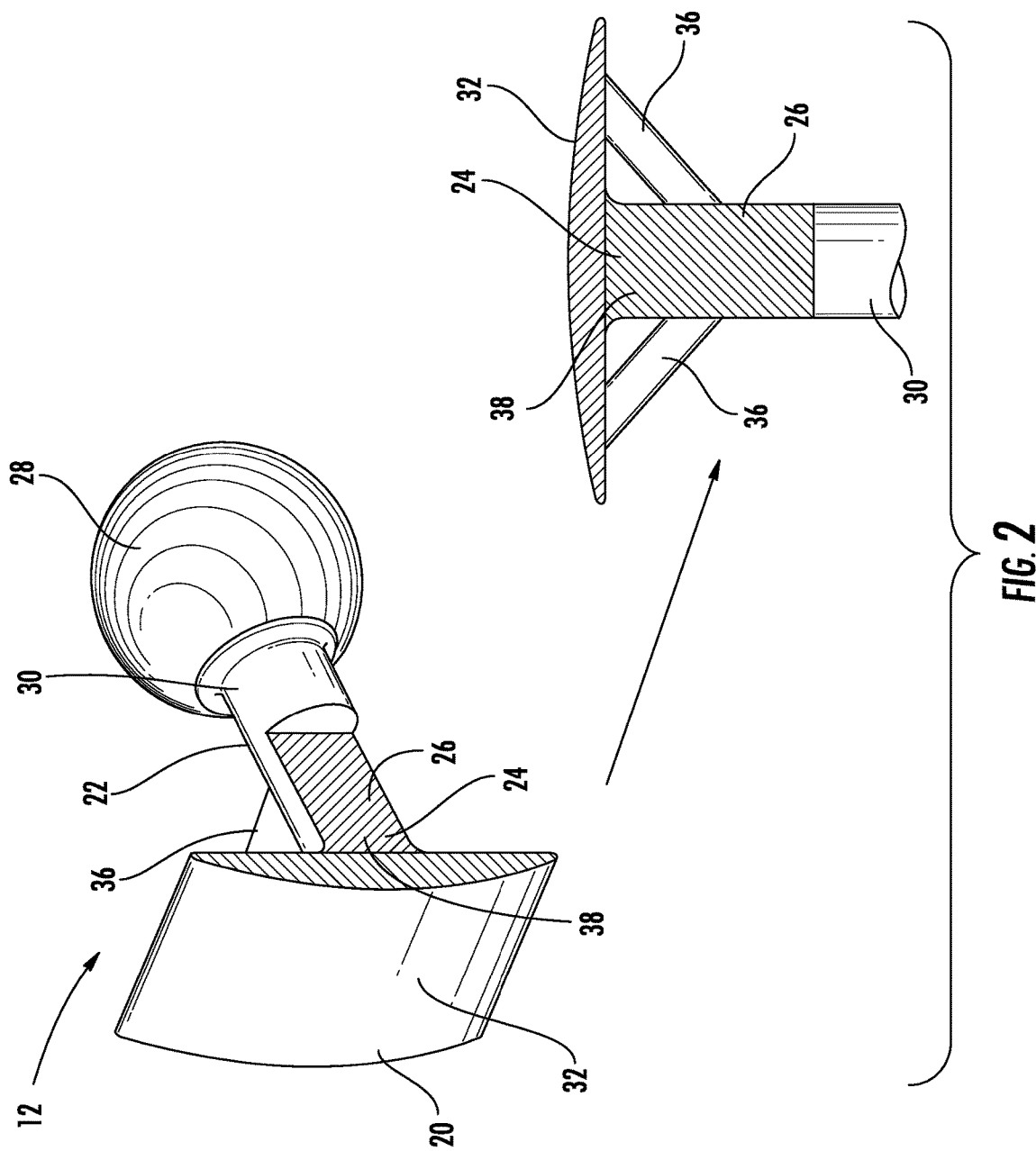
FIG. 2 is a cut-away view of the support member of FIG. 1.
Figure 3:
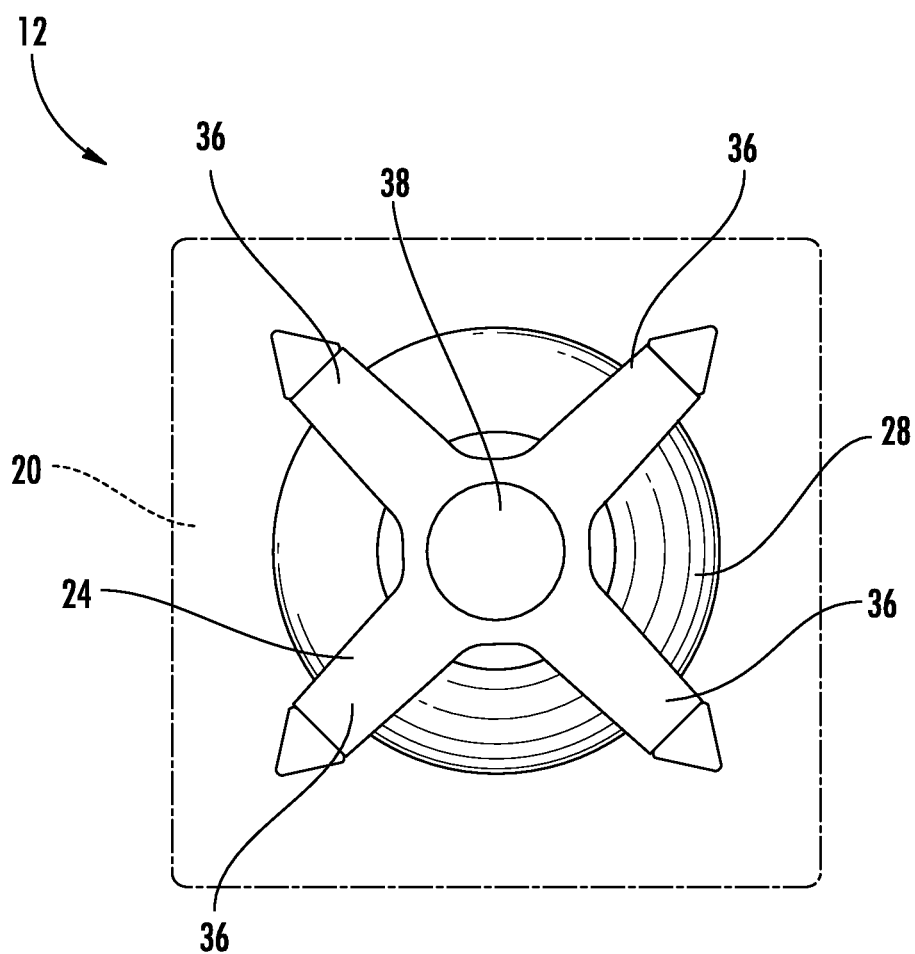
FIG. 3 is a top view of the support member of FIG. 1 with the upper support surface shown in broken lines.
Figure 4:
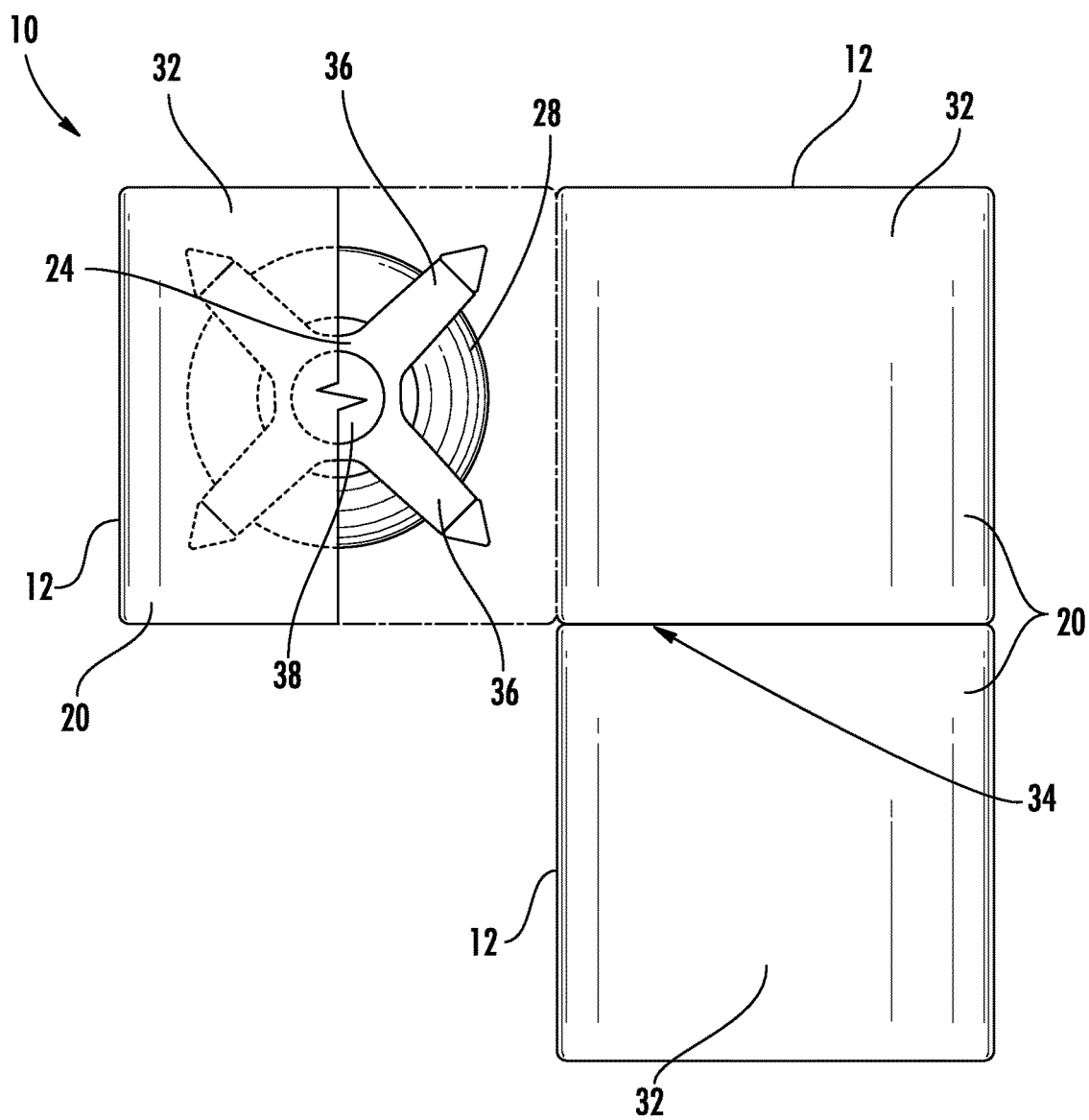
FIG. 4 is a top view of a plurality of the support members of FIG. 1 arranged to form a dynamic surface.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of vehicle seats may be described with reference to an aircraft seat, they are by no means so limited. In fact, the seats may be used in conjunction with any type of vehicle or otherwise as desired.

According to certain embodiments of the present invention, as shown in FIGS. 1-9, a dynamic support system 10 may comprise a plurality of support members 12, a base material 14, a locking layer 16, and/or a support layer 18.

In some embodiments, each support member 12 comprises an upper support surface 20, a stud 22, at least one connection member 24 that extends from the upper support surface 20 to a first end 26 of the stud 22, and a spherical member 28 that extends from a second end 30 of the stud 22.

In certain embodiments, the upper support surface 20 is formed of a flexible material that allows the upper support surface 20 itself to resiliently bend when an external force is applied to the upper support surface 20. The upper support surface 20 may be shaped to have an outer surface 32 with a curved profile. In other embodiments, the upper support surface 20 may have an outer surface 32 with a substantially flat profile and curved edges. In certain embodiments, as shown in FIGS. 1-6, an outer perimeter shape of the upper support surface 20 may be square, hexagonal, spherical, or rectangular. However, a person of ordinary skill in the relevant art will understand that the upper support surface 20 may have any suitable shape that allows each upper support surface 20 to interlock with adjacent upper support surfaces 20 so as to form a dynamic surface 34 with minimal gaps between the individual upper support surfaces 20, including but not limited to triangular, pentagonal, polyominoes, any regular or irregular tessellation, semi-regular tessellation (comprising more than one kind of regular polygon but still having the same arrangement of polygons at every corner), or any other suitable shape.

The connection member 24 may comprise a plurality of prongs 36 that extend from a central core 38, wherein the core 38 supports a central portion of the upper support surface 20 and the prongs 36 are configured to extend to each corner or edge of the upper support surface 20. In these embodiments, the connection member 24 acts as a brace to flexibly support the upper support surface 20 when an external force is applied to the upper support surface 20.

The prongs 36 may be configured to taper from the corner and/or edge of the upper support surface 20 to the first end 26 of the stud 22, and the central core 38 may be configured to extend downward from the central portion of the upper support surface 20 to the first end 26 of the stud 22.

Some or all of the components of the support member 12 may be integrally formed as a single piece through injection molding or other suitable processes, such as three-dimensional printing. Some or all of the components of the support member 12 may be formed of nylon or other polyamides, which may provide certain benefits of being resistant to wear and abrasion, good mechanical properties, good chemical resistance with additives, and/or flame retardancy (which may be important in certain applications, such as aviation material safety requirements). However, a person of ordinary skill in the relevant art will understand that there are many other materials that may provide similar or improved properties and that not all (or none) of these properties may be important for certain applications so that other materials that may provide few or none of these properties may also be used.

The outer surface 32 of the upper support surface 20 may range in dimensions from less than 0.5 inches to over 4 inches in overall length, width, and/or diameter. In certain embodiments, the outer surface 32 may have overall outer dimensions that range from approximately a diameter of a ball point pen to the size of a face of a deck of cards. However, a person of ordinary skill in the relevant art will understand that other suitable dimensions may be used as needed to achieve the desired performance characteristics.

In certain embodiments, the longitudinal length of the stud 22 may be approximately 0.5 inches to approximately 1.5 inches. However, a person of ordinary skill in the relevant art will understand that other suitable dimensions may be used as needed to achieve the desired characteristics. In certain embodiments, the stud 22 may have a substantially cylindrical cross-sectional shape. In other embodiments, the stud 22 may have rectangular, polygonal, elliptical, or other suitable shape. In cases where the stud 22 is injection molded, the stud 22 may comprise a draft angle of approximately 1° to allow the part to be removed from the injection mold after formation.

The spherical member 28 may comprise a diameter of approximately 0.5 inches to approximately 1.5 inches. However, a person of ordinary skill in the relevant art will understand that other suitable diameter sizes may be used as needed to achieve the desired characteristics.

Figure 7:
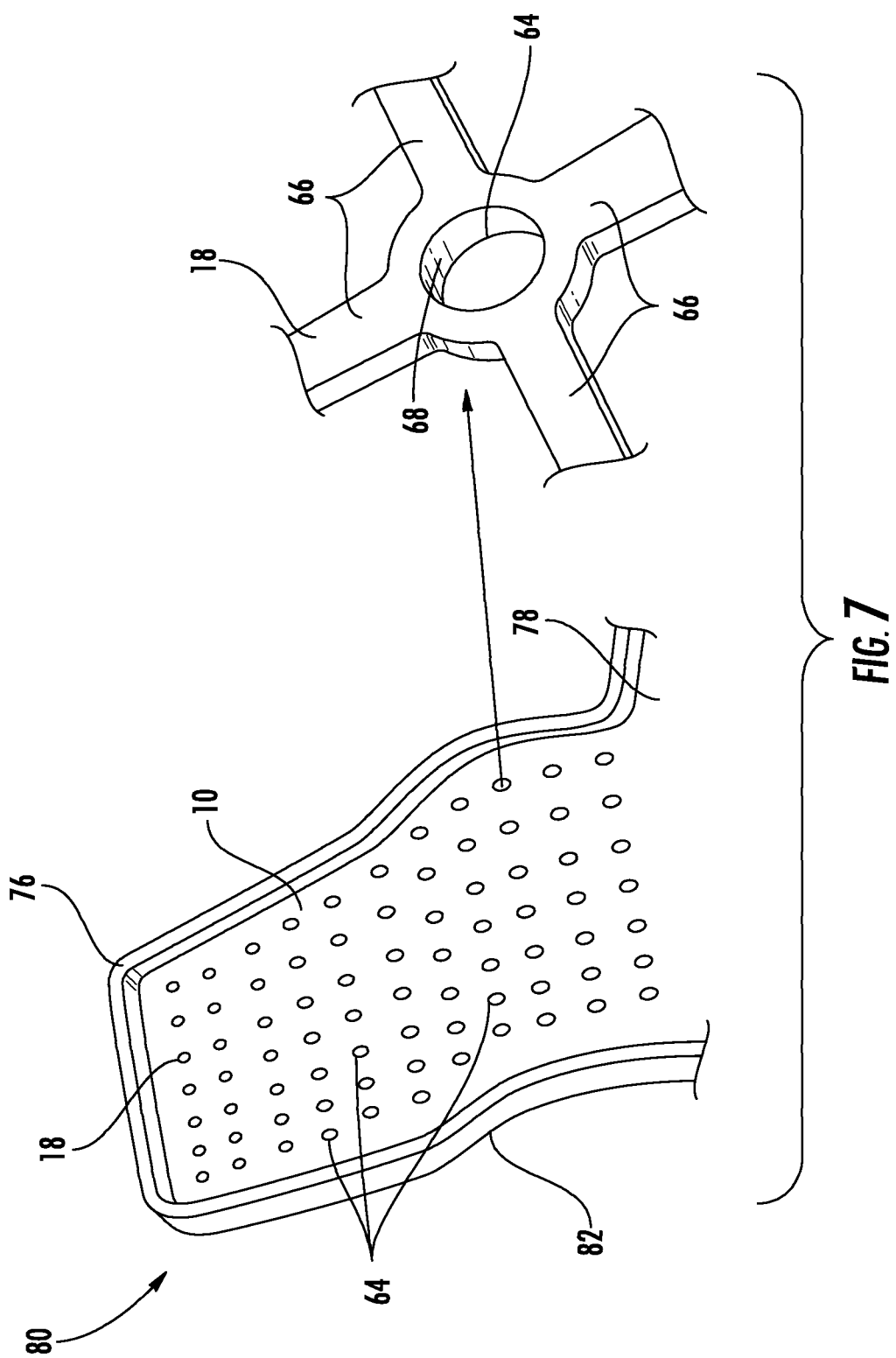
FIG. 7 is a partial view of a passenger seat showing a support layer of a dynamic support system, according to certain embodiments of the present invention.
Figure 8:
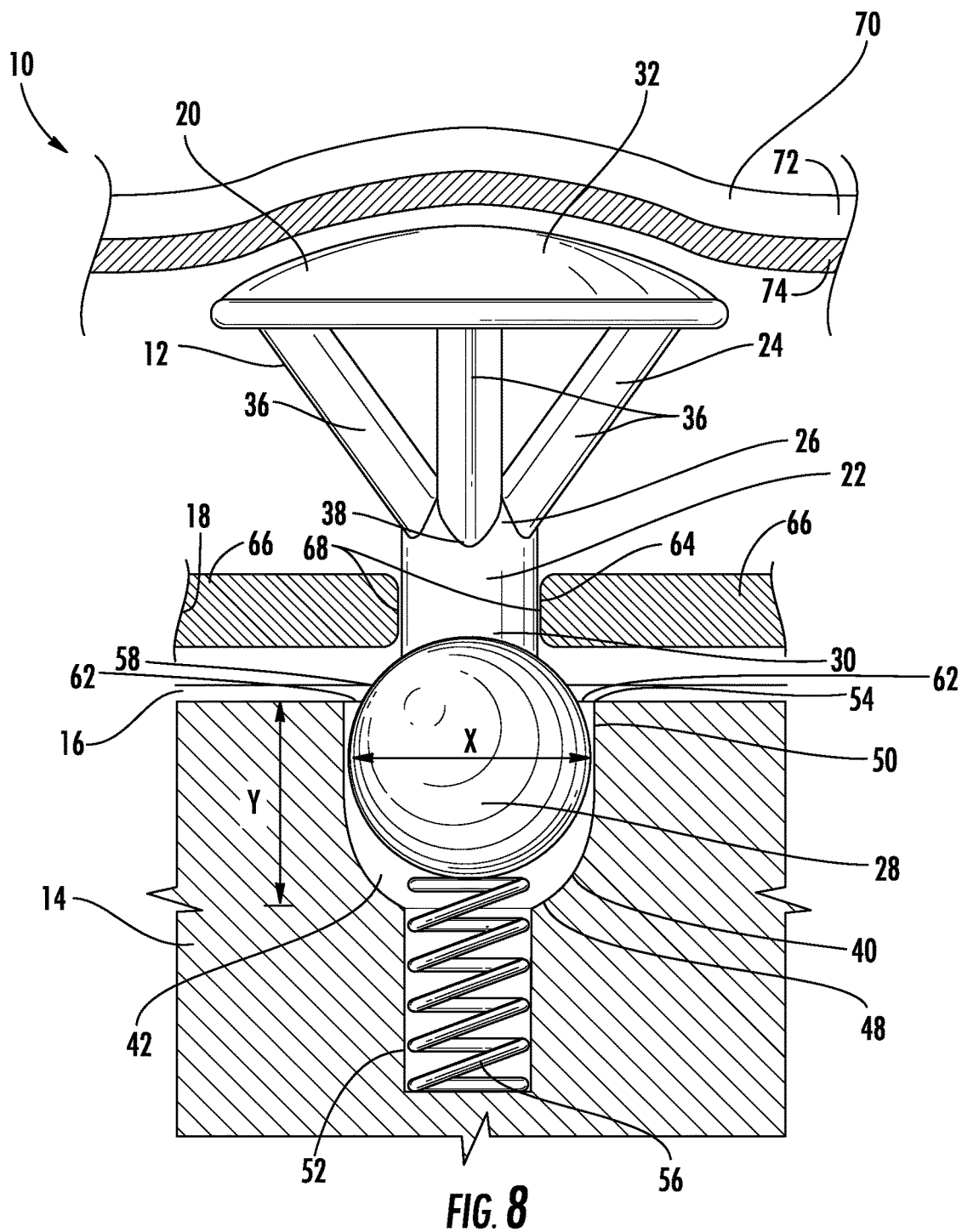
FIG. 8 is a cross-sectional view of portions of a dynamic support system with a support member, according to certain embodiments of the present invention.

According to certain embodiments, as shown in FIGS. 7-8, the base material 14 comprises a plurality of receptacles 40. Each receptacle may comprise a socket 42 that is shaped to receive the spherical member 28. For example, the socket 42 may comprise a curved lower surface 48 and sides 50, with a lateral dimension X of the socket 42 that approximates the diameter of the spherical member 28, and a longitudinal dimension Y of the socket 42 that has a greater length than the diameter of the spherical member 28. The longer longitudinal dimension Y allows for longitudinal movement of the spherical member 28 within the socket 42, while the smaller lateral dimension X provides a snug lateral fit between the spherical member 28 and the socket 42 to minimize lateral shifting (while still allowing lateral rotation) of the spherical member 28 within the socket 42.

In certain embodiments, a recessed area 52 may be connected to the socket 42, and may be oriented along the longitudinal axis of the receptacle 40 and/or positioned to substantially oppose an opening 54 to the receptacle 40 (through which the spherical member 28 may be inserted into the receptacle 40). The recessed area 52 may be shaped to receive and retain a spring 56. The spring 56 may have an uncompressed length that exceeds a longitudinal length of the recessed area 52 so that the spring 56 extends beyond the recessed area 52 and at least some distance into the space within the socket 42. In certain embodiments, the spring 56 is configured to contact the spherical member 28 within the socket 42.

The base material 14 may be formed of nylon or other polyamides, and certain properties of these materials are discussed above. However, a person of ordinary skill in the relevant art will understand that there are many other materials that may provide similar or improved properties and that not all (or none) of these properties may be important for certain applications so that other materials that may provide few or none of these properties may also be used.

In certain embodiments, the base material 14 may be integrally formed as a single piece through injection molding or other suitable processes, such as three-dimensional printing. Furthermore, the base material 14 may have a thickness ranging from 1.57 inches (40 mm) to 2.36 inches (60 mm) (depending on the dimensions of the diameter of the spherical member 28, longitudinal dimension Y of the socket 42, longitudinal length of the recessed area 52, and the length of the spring 56).

In some embodiments, the locking layer 16 may be coupled to the base material 14, wherein the locking layer 16 comprises a plurality of apertures 58.

The apertures 58 may be arranged within the locking layer 16 so that a central axis of each aperture 58 substantially aligns with a longitudinal axis of a corresponding receptacle 40 in the base material 14. The apertures 58 may have any suitable shape including but not limited to circular, rectilinear, parabolic, or any other similar shape. In certain embodiments, the stud 22 of each support member 12 is positioned to extend through the corresponding aperture 58. In these embodiments, the diameter of the aperture 58 is smaller than the diameter of the spherical member 28 so as to retain the spherical member 28 within the socket 42. In certain embodiments, the aperture 58 may comprise inner walls 62, which may be curved to mate with the contour of the spherical member 28.

In certain embodiments, the locking layer 16 may be integrally formed as part of the base material 14.

As best illustrated in FIG. 8, in certain embodiments, the spherical member 28 within the socket 42 is in a neutral position when the spherical member 28 is positioned adjacent the inner walls 62 of one of the apertures 58 of the locking layer 16.

In certain embodiments, the spring 56 is configured to apply a force to maintain the spherical member 28 in the neutral position until an external force is applied to the upper support surface 20 of the support member 12, thereby causing the support member 12 to move toward the socket 42. Such movement may compress the spring 56 until the spherical member 28 reaches a recessed position, in which the spherical member 28 is positioned adjacent the curved bottom 62 of the socket 42, and the spring 56 is compressed within the recessed area 52. Once the external force is removed or diminished, the spring 56 returns the spherical member 28 to the neutral position.

In certain embodiments, as best illustrated in FIGS. 7-8, the support layer 18 is positioned above the locking layer 16. The support layer 18 may be formed of any suitable material comprising an appropriate balance of stiffness and elasticity, including but not limited to elastomers, thermoplastics, thermosets, and foams.

The support layer 18 may comprise a plurality of apertures 64. The support layer 18 may also comprise a grid design comprising a plurality of intersecting grid lines 66 with the apertures 64 positioned at the intersections of at least some of the grid lines 66. By using a grid design instead of a solid sheet of material, the weight of the support layer 18 may be minimized. The grid design also allows the support layer 18 to be more flexible to accommodate contour adjustments.

The apertures 64 may be arranged on the support layer 18 so that a central axis of each aperture 64 substantially aligns with a longitudinal axis of a corresponding receptacle 40 in the base material 14. The apertures 64 may have any suitable shape including but not limited to circular, rectilinear, parabolic, or any other similar shape. In certain embodiments, the stud 22 of each support member 12 is positioned to extend through the corresponding aperture 64. In these embodiments, the diameter of the aperture 64 is slightly larger than the cross-sectional shape of the stud 22.

In certain embodiments, walls 68 of the aperture 64 are configured to maintain the stud 22 in an upright position, which is when a longitudinal axis of the stud 22 is substantially aligned with the longitudinal axis of the receptacle 40.

In certain embodiments, the walls 68 are configured to maintain the stud 22 in the upright position until an external force is applied to the stud 22 to cause the stud 22 to angle toward and press against a portion of the walls 68. Because of the elastic properties of the support layer 18, the portion of the wall 68 contacting the stud 22 bends with the application of force by the stud 22 until the stud 22 reaches an angled position in which the stud 22, the upper support surface 20, and/or the connection member 24 contacts another surface that resists further movement of the stud 22 in that direction. Once the external force is removed or diminished, the walls 68 return the stud 22 to the upright position.

In addition to the longitudinal movement of the spherical member 28 between the neutral and recessed positions within the socket 42, and the movement of the stud 22 between the upright and angled positions in any 360° angular direction against the walls 68 of the aperture 64, the support member 12 may also laterally rotate within the socket 42 to the extent the upper support surface 20 does not prevent such rotation by being interlocked with adjacent upper support surfaces 20.

Figure 5:
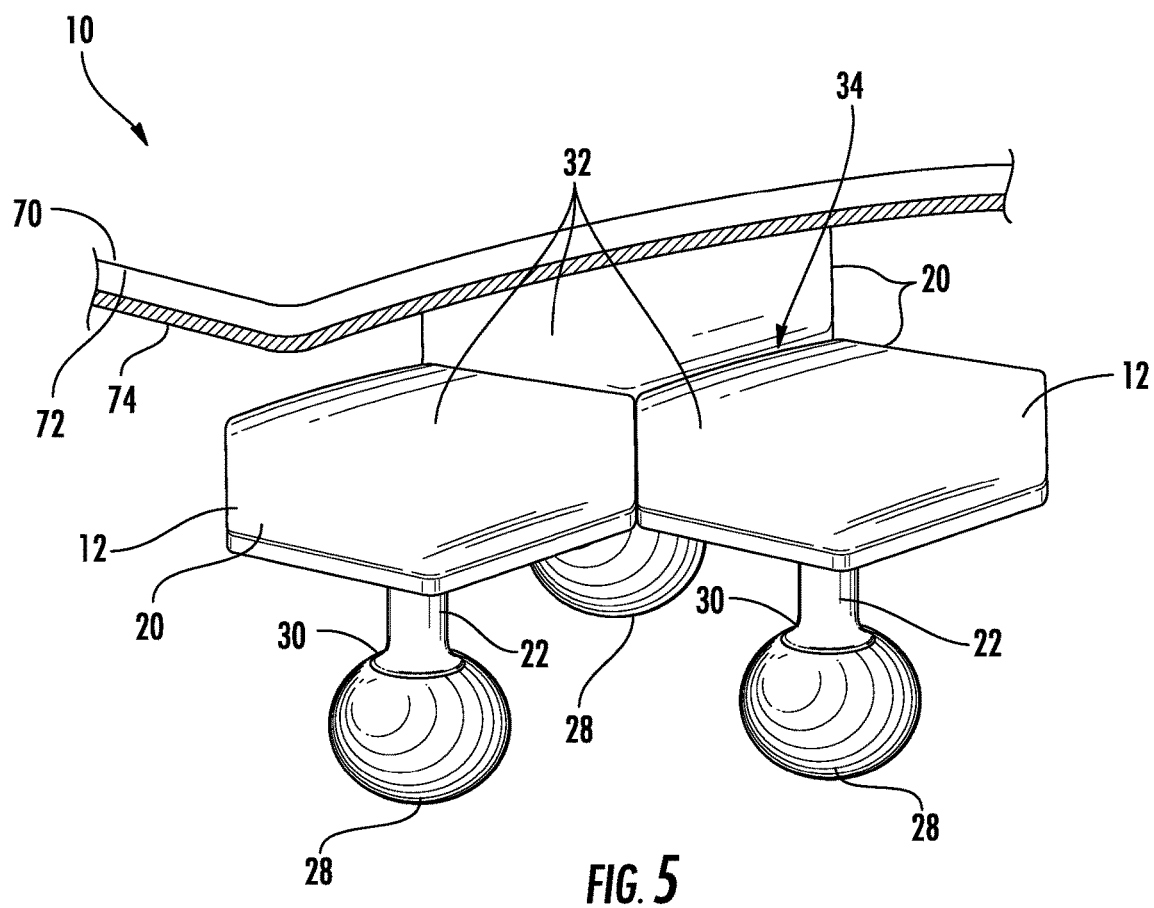
FIG. 5 is a partial view of a dynamic support system with a plurality of support members, according to certain embodiments of the present invention.
Figure 6:
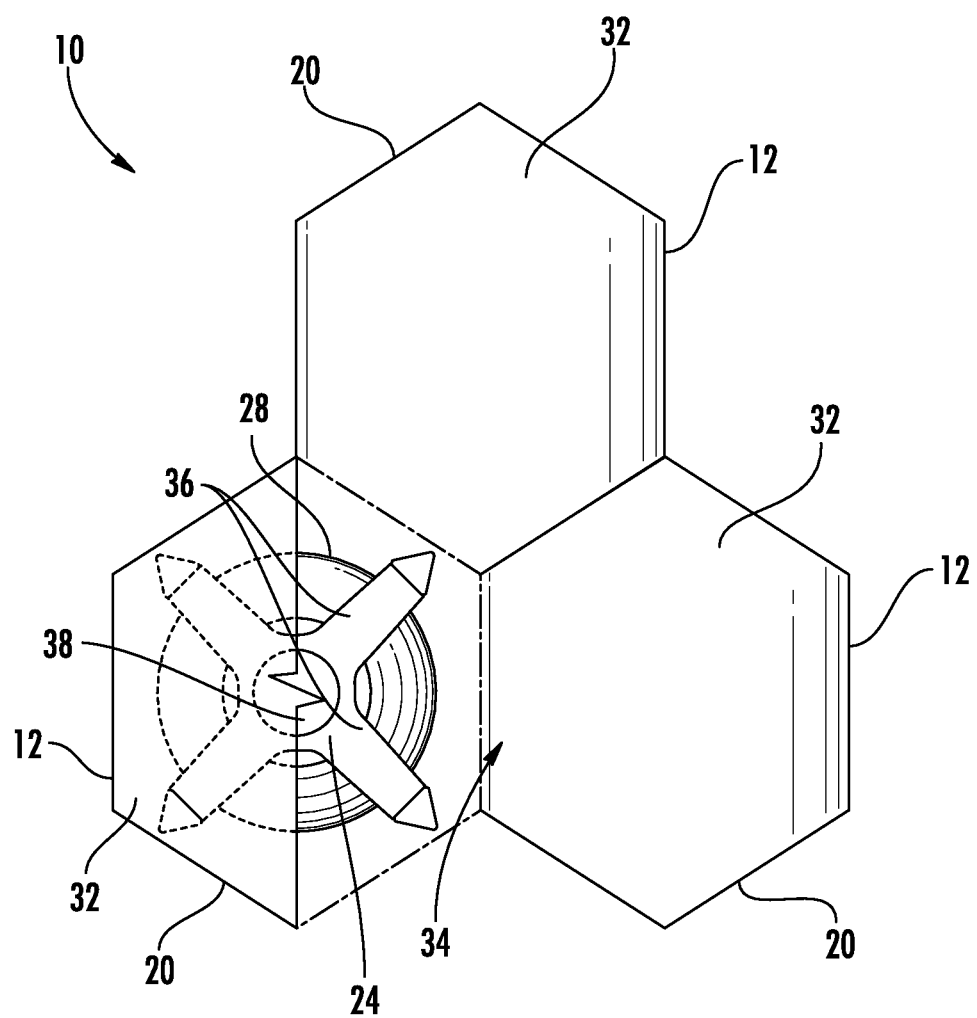
FIG. 6 is a top view of the plurality of support members of FIG. 5 arranged to form a dynamic surface.

In certain embodiments, a cushion layer 70 may be positioned over the upper support surfaces 20 of the support members 12. The cushion layer 70 may be formed of a single or multiple materials layered and/or interwoven with each other. For example, as shown in FIGS. 5 and 8, the cushion layer 70 may comprise a top sub-layer 72 formed of comfort foam or memory foam, and a bottom sub-layer 74 formed of High Density ("HD") foam, depending on each region of the human body for optimal pressure distribution.

In certain embodiments, the dynamic support system 10 may be coupled to a seat back 76 and/or a seat pan 78 of a passenger seat 80. To do so, the base material 14 may be coupled to an outer shell 82 of the seat back 76 and/or the seat pan 78. In certain embodiments, the recessed area 52 may comprise a second opening that allows each spring 56 to be biased against the outer shell 82 instead of being biased against an additional layer of the base material 14 between the spring 56 and the outer shell 82.

Figure 9:
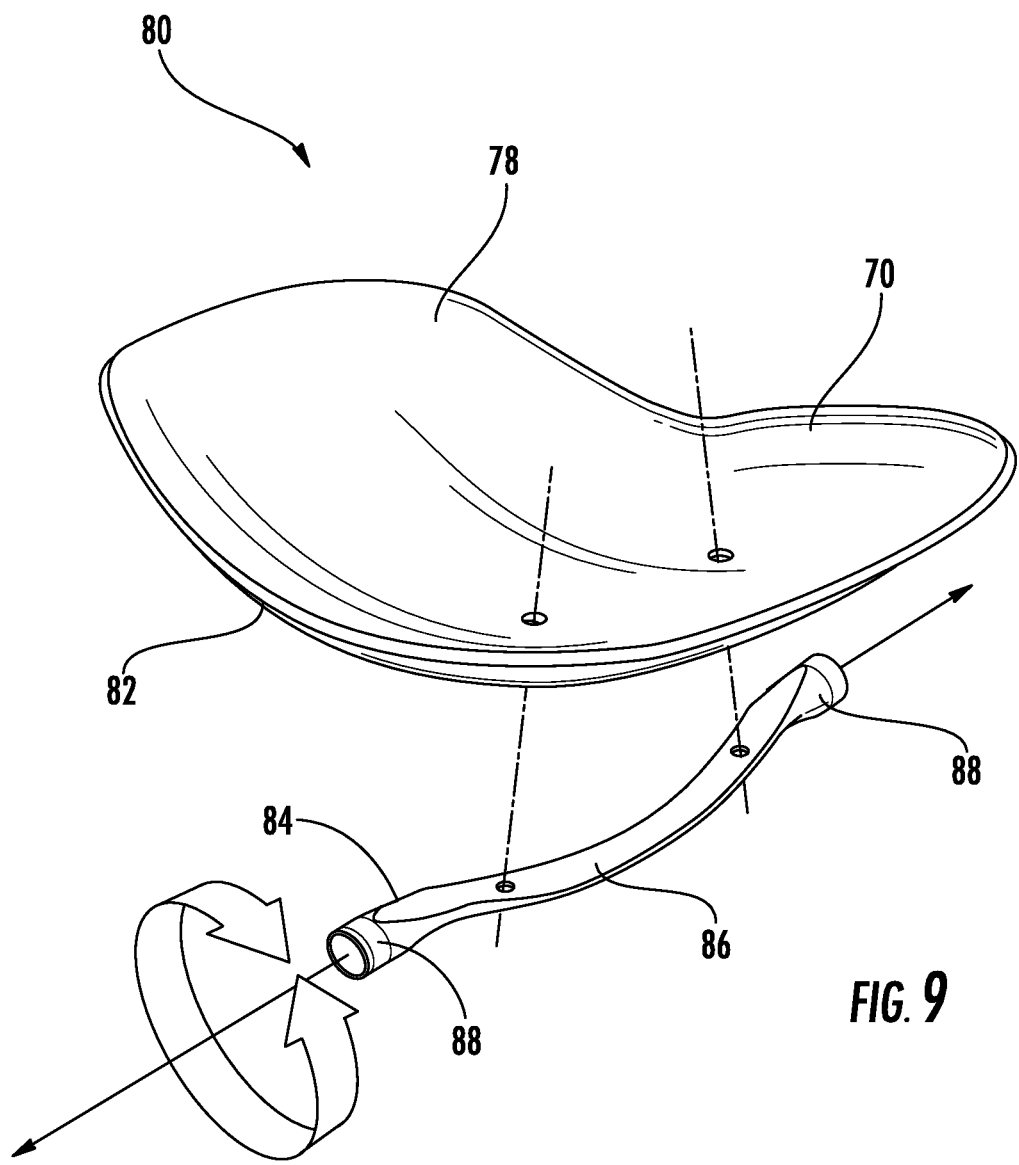
FIG. 9 is a perspective view of a dynamic support system on a seat pan of a passenger seat with a swivel bar, according to certain embodiments of the present invention.

To provide further enhance posture adjustment, the seat pan 78 may be coupled to a swivel bar 84, as illustrated in FIG. 9. The swivel bar 84 comprises a curved portion 86 that is positioned below the seat pan 78 and ends 88, which are pivotally coupled to a seat frame (not shown). The swivel bar provides for larger scale dynamic adjustments of the passenger seat 80.

To assemble the dynamic support system 10, the spherical member 28 of each support member 12 is inserted within the socket 42 of each receptacle 40, and the locking layer 16 is then positioned so that the apertures 58 are positioned over and aligned with the sockets 42. The studs 22 may be coupled to the spherical members 28 after the spherical members 28 have been inserted into the sockets 42 or the studs 22 and spherical members 28 may be integrally so that the locking layer 16 is positioned over the studs 22. The support layer 18 is then positioned so that the apertures 64 are positioned over and aligned with the sockets 42 so that the studs 22 are positioned within the apertures 64. In certain embodiments, the upper support surfaces 20 and connection members 24 are then coupled to the first ends 26 of the studs 22 via a threaded coupling, snap-fit, or other suitable mechanical or chemical coupling design.

In other embodiments, the locking layer 16 and/or the support layer 18 may be configured to be positioned around integrally formed support members 12 so that the upper support surface 20 does not need to be separately connected to the stud 22.

During use, when a passenger is seated in the passenger seat 80, the passenger applies pressure to the support members 12, which may result in a bending of the upper support surface 20, a longitudinal movement of the spherical member 28 within the socket 42, angular movement of the stud 22 against a portion of the walls 68 surrounding the stud 22, and/or rotational movement of the spherical member 28 within socket 42.

In certain embodiments, the overall size and/or shape of the outer surfaces 32 of the plurality of support members 12 may vary in terms of the amount of flexibility needed to provide a suitable amount of contouring, depending on the location within the seat pan 78 and/or the seat back 76 where the plurality of support members 12 are being used. For example, for locations on the seat pan 78 and/or the seat back 76 where a portion of the passenger's body seated in the passenger seat 80 that contacts the plurality of support members 12 is not substantially contoured (such an upper and/or middle back region), the outer surfaces 32 may be larger.

In contrast, for locations on the seat pan 78 and/or the seat back 76 where the portion of the passenger's body seated in the passenger seat 80 that contacts the plurality of support members 12 is are substantially contoured (such an a lower back, buttocks, and/or shoulder region), the outer surfaces 32 may be smaller.

In other words, a first portion of the plurality of support members 12 may each comprise outer surfaces 32 having an outer surface with length and/or width dimensions of less than approximately 1 inch, so as to provide a desired amount of contouring to areas of a passenger's body that are typically substantially contoured. A second portion of the plurality of support members 12 each comprise outer surfaces 32 having an outer surface with length and/or width dimensions of greater than approximately 2 inches, so as to provide a desired amount of contouring to areas of a passenger's body that are typically not substantially contoured.

Likewise, the types of springs 56 that are included may vary in terms of the level of resistance needed to provide a suitable amount of longitudinal compression, depending on the location within the seat pan 78 and/or the seat back 76 where the springs 56 are being used. For example, for locations on the seat pan 78 and/or the seat back 76 where a portion of the passenger's body seated in the passenger seat 80 that contacts the plurality of support members 12 does not typically apply a large external force to the support members 12 (such as a lower back region), the springs 56 may have a lower spring constant (i.e., more easily compressed).

In contrast, for locations on the seat pan 78 and/or the seat back 76 where a portion of the passenger's body seated in the passenger seat 80 that contacts the plurality of support members 12 typically does apply a large external force to the support members 12 (such as a buttocks, thigh, and/or shoulder region), the springs 56 may have a higher spring constant (i.e., less easily compressed). In any event, the springs 56 are typically configured to allow a range of longitudinal movement of the spherical member 28 of between approximately 0.5 inches to approximately 1.5 inches, between the neutral position and the recessed position based on a typical amount of force expected to be applied in that location of the seat 80.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A dynamic support system comprising:
   a plurality of support members, each support member comprising:
      an upper support surface extending from a first end of a stud; and
      a spherical member extending from a second end of the stud;
   a base material comprising a plurality of receptacles, each receptacle comprising:
      a socket shaped to receive the spherical member of one of the plurality of support members, the socket comprising a recessed area; and
      a spring positioned within the recessed area of the socket and configured to contact a surface of the spherical member of one of the plurality of support members positioned within the socket;
   a support layer positioned above the base material, wherein the support layer comprises a plurality of apertures, each aperture being shaped to allow the stud of one of the plurality of support members to extend there through.

2. The dynamic support system of claim 1, further comprising a locking layer coupled to the base material, wherein the locking layer comprises a plurality of apertures, each aperture being shaped to allow the stud of one of the plurality of support members to extend there through and retain the spherical member of one of the plurality of support members within the socket.

3. The dynamic support system of claim 1, wherein the spring is configured to position the spherical member of one of the plurality of support members in a neutral position adjacent inner walls of one of the plurality of apertures of the locking layer.

4. The dynamic support system of claim 3, wherein the spring is configured to compress within the recessed area when the support member is in a recessed position adjacent a curved bottom of the socket.

5. The dynamic support system of claim 4, wherein a distance between the neutral position and the recessed position is approximately 1 inch.

6. The dynamic support system of claim 1, wherein each of the plurality of support members is configured to longitudinally translate between a neutral position and a recessed position within the socket, angularly translate in any direction between an upright position and an angled position within the surrounding aperture of the support layer, and laterally rotate within the socket.

7. The dynamic support system of claim 1, wherein the plurality of support members are positioned so that each upper support surface interlocks with adjacent upper support surfaces so as to form a dynamic surface with minimal gaps between the adjacent upper support surfaces.

8. The dynamic support system of claim 7, wherein each upper support surface of the plurality of support members has a square or hexagonal outer perimeter shape.

9. The dynamic support system of claim 1, wherein at least one connection member extends from the upper support surface to the first end of the stud.

10. The dynamic support system of claim 9, wherein the at least one connection member comprises a plurality of prongs that extend from a central core, wherein the central core supports a central portion of the upper support surface, and the plurality of prongs extend to each corner or edge of the upper support surface.

11. The dynamic support system of claim 1, wherein the support layer comprises a grid design comprising a plurality of intersecting grid lines with the plurality of apertures positioned at intersections of at least some of the grid lines.

12. A passenger seat comprising:
   a seat pan and a seat back, wherein at least one of the seat pan and the seat back are substantially covered by a dynamic support system comprising:
      a plurality of support members, each support member comprising:
         a flexible upper support surface extending from a first end of a stud; and
         a spherical member extending from a second end of the stud;
      a base material comprising a plurality of receptacles, each receptacle comprising:
         a socket shaped to receive the spherical member, the socket comprising a recessed area; and
         a spring positioned within the recessed area and configured to contact a surface of the spherical member positioned within the socket;
      a locking layer coupled to the base material, wherein the locking layer comprises a plurality of apertures, each aperture being shaped to allow the stud of each support member to extend there through and retain the spherical member within the socket; and
      a support layer positioned above the locking layer, wherein the support layer comprises a plurality of apertures, each aperture being shaped to allow the stud of each support member to extend there through.

13. The passenger seat of claim 12, further comprising
a first portion of the plurality of support members, wherein each of the first portion comprises flexible upper support surfaces having an outer surface with at least one of a length dimension and a width dimension less than approximately 1 inch; and
a second portion of the plurality of support members, wherein each of the second portion comprises flexible upper support surfaces having an outer surface with at least one of a length dimension and a width dimension greater than approximately 2 inches.

14. The passenger seat of claim 13, wherein the first portion is positioned on at least one of the seat pan and the seat back in at least one area where a portion of a passenger's body seated in the passenger seat that contacts the first portion of the plurality of support members is substantially contoured.

15. The passenger seat of claim 13, wherein the second portion is positioned on at least one of the seat pan and the seat back in at least one area where a portion of a passenger's body seated in the passenger seat that contacts the first portion of the plurality of support members is not substantially contoured.

16. The passenger seat of claim 12, wherein each of the plurality of support members is configured to longitudinally translate between a neutral position and a recessed position within the socket, angularly translate in any direction between an upright position and an angled position within the surrounding aperture of the support layer, and laterally rotate within the socket.

17. The passenger seat of claim 12, wherein the plurality of support members are positioned so that each upper support surface interlocks with adjacent upper support surfaces so as to form a dynamic surface with minimal gaps between the adjacent upper support surfaces.

18. A method of assembling a dynamic support system comprising a base material comprising a plurality of receptacles, each receptacle comprising a socket, a support layer comprising a plurality of apertures, and a plurality of support members, each support member comprising an upper support surface extending from a first end of a stud and a spherical member extending from a second end of the stud, the method comprising:
   inserting the spherical member of each support member into the socket of one of the plurality of receptacles in the base material; and
   positioning the support layer over a locking layer so that the stud of each support member extends through one of the plurality of apertures of the support layer.

19. The method of claim 18, further comprising coupling the upper support surface to the first end of each stud.

20. The method of claim 18, further comprising positioning a cushion layer over the upper support surfaces of the plurality of support members.

* * * * *